US012469231B2

(12) United States Patent
Kim

(10) Patent No.: US 12,469,231 B2
(45) Date of Patent: Nov. 11, 2025

(54) SYSTEM AND METHOD FOR BLOCKCHAIN TOKEN-AUTHENTICATED HOLOGRAPHIC COMPANIONSHIP PROFILE AND CONTENT SYNTHESIS AND SHARING

(71) Applicant: DoubleMe, Inc., Seoul (KR)

(72) Inventor: Heekwan Kim, Seoul (KR)

(73) Assignee: DoubleMe, Inc., Seoul (KR)

( * ) Notice: Subject to any disclaimer, the term of this patent is extended or adjusted under 35 U.S.C. 154(b) by 250 days.

(21) Appl. No.: 18/319,192

(22) Filed: May 17, 2023

(65) Prior Publication Data

US 2024/0386676 A1 Nov. 21, 2024

(51) Int. Cl.
*G06T 19/00* (2011.01)
*H04L 9/00* (2022.01)
*H04L 9/08* (2006.01)

(52) U.S. Cl.
CPC .......... *G06T 19/006* (2013.01); *H04L 9/0844* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2014/0132630 A1* | 5/2014 | Mun | ................ | H04N 21/42203 345/633 |
| 2018/0366118 A1* | 12/2018 | Lovitt | ................... | G10L 15/063 |
| 2019/0043447 A1* | 2/2019 | Chung | ................ | G02B 27/017 |
| 2019/0304406 A1* | 10/2019 | Griswold | ............. | G02B 27/017 |
| 2020/0186338 A1* | 6/2020 | Andon | ................... | G06F 7/588 |
| 2020/0257245 A1* | 8/2020 | Linville | ............... | G03H 1/2249 |
| 2021/0263469 A1* | 8/2021 | Seo | ........................ | H04N 13/117 |
| 2023/0205133 A1* | 6/2023 | Matusik | ................... | G03H 1/04 359/9 |
| 2024/0046219 A1* | 2/2024 | Thalluri | ................. | G10L 15/30 |
| 2024/0155072 A1* | 5/2024 | Abhishek | ............... | H04N 7/147 |

* cited by examiner

*Primary Examiner* — David H Chu
(74) *Attorney, Agent, or Firm* — Invent Capture, LLC.; Samuel S. Cho

(57) ABSTRACT

A novel electronic system and a method of its operation provide holographic companionship profile and content synthesis and sharing among companion broadcasters and remote users. Each holographic companionship profile is symbolized by a blockchain token as a form of identification-theftproof digital identification, which is issued and authenticated by a blockchain during profile creation and modifications. In context of embodiments of the present invention, a "blockchain" is a decentralized public ledger that keeps track of transactions across a network of computer nodes, and a "blockchain token" is an asset symbolizing a particular identity. The blockchain token-authenticated holographic companionship profile may represent a companion broadcaster or a remote user accessing the holographic companionship profile and content synthesis and sharing system. Companion broadcasters and remote users can safely synthesize and share three-dimensional (3D) holographic companionship contents, while minimizing the probability of content and identify thefts on the novel electronic system.

8 Claims, 7 Drawing Sheets

An Example of Blockchain Token-Authenticated Holographic Companionship Profile and Content Synthesis and Sharing An Example of Blockchain Token-Authenticated Holographic Companionship Profile and Content Synthesis and Sharing

200

A Method of Operating a Blockchain Token-Authenticated Holographic Companionship Profile and Content Synthesis and Sharing System A System Block Diagram for Blockchain Token-Authenticated Holographic Companionship Profile and Content Synthesis and Sharing

400

A Dataflow Diagram for Blockchain Token-Authenticated Holographic Companionship Profile and Content Synthesis and Sharing A Single Camera and Machine Learning-Based Holographic Image Capture Example Target Object-Initiated Self-Rotation Around the Single Camera and Machine Learning Apparatus for Hologram Generation 701  703

700

Cost and Convenience Advantage of the Single Camera and Machine Learning-Based Holographic Image Capture Method A Blockchain Token-Authenticated Holographic Companionship Profile and Content Synthesis and Sharing Example

SYSTEM AND METHOD FOR BLOCKCHAIN TOKEN-AUTHENTICATED HOLOGRAPHIC COMPANIONSHIP PROFILE AND CONTENT SYNTHESIS AND SHARING

BACKGROUND OF THE INVENTION

The present invention generally relates to holographic content creation and communication among online companions with authenticated profiles. In particular, the present invention relates to systems and methods for blockchain token-authenticated holographic companionship profile and content synthesis and sharing of holographic contents among authenticated companions. In addition, the present invention also relates to immersive mixed-reality visualization of real physical and holographic elements in a designated real physical space.

One of the leading causes of depression and mental illness in modern society is loneliness. As family structures in most developed countries become increasingly nucleus or skeletal in the post-industrial era, many people end up living alone after separating from existing family members. Furthermore, pervasive individualism and fast-changing social dynamics in modern times make lasting "offline" or in-person friendships more difficult, regardless of their age, gender, education, and income levels. Many people in modern society are thus interested in reaching beyond their localities and/or personal circles of friends to find new friends, companions, or dates to experience fresh human connection and/or to escape loneliness in their lives.

Therefore, it is not a pure coincidence that over the last few decades, the ubiquity of convenient access to the Internet and related data networks with personal computers and mobile devices engendered a multibillion-dollar online dating and friend-finder industry in numerous countries. With complimentary or subscription fee-based structures, conventional online dating and friend-finder operators serve as a platform for users to upload their individual profile descriptions and personal multimedia data (e.g. photos, videos, hyperlinks to social networks, etc.) that may supplement each individual profile in search of desirable friends, dates, and/or companions over the Internet.

Unfortunately, conventional online dating and friend-finder services that accommodate uploading, updating, searching, and sharing individual profile descriptions and related multimedia are currently unable to provide an immersive three-dimensional (3D) holographic real-time communication among online dating or friend-finder members. At best, conventional online dating and friend-finder services provide textual, email, or two-dimensional (2D) webcam-based communication, which lack the lifelike, vivid, and virtualized graphical realism that novel 3D holographic communications may be able to provide to online members in the future.

Furthermore, conventional online dating and friend-finder services are typically littered with pseudo (i.e. "fake") or dubious profiles that may have been uploaded by a crime ring or a criminal with ulterior motives, such as extracting sensitive personal information from unsuspecting victims for identity thefts after approaching them as online friends or dates. Moreover, stealing passwords from existing legitimate members of online dating or friend-finder sites via phishing, smishing, and server hacking are unfortunate yet frequent occurrences that threaten members' privacy and financial security.

Therefore, it may be desirable to provide a novel electronic system and a related method of operation that securely accommodate holographic content creation and communication among online companions with authenticated profiles. More particularly, it may be desirable to devise a novel electronic system and a related method of operation that provide blockchain token-authenticated three-dimensional (3D) holographic companionship profile and content synthesis and sharing of holographic contents among authenticated companions.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In a preferred embodiment of the invention, a method of operating a blockchain token-authenticated holographic companionship profile and content synthesis and sharing system is disclosed. This method comprises the steps of: (1) registering profiles of potential remote users and potential companion broadcasters with a blockchain, wherein each of the potential remote users and the potential companion broadcasters registers his or her personal profile description and related multimedia file in the blockchain and receives a blockchain token as a unique private cryptographic key, which symbolizes a specific chronological chain of information stored as part of his or her personal profile; (2) authenticating registered profiles of a first remote user and a companion broadcaster with the blockchain by requiring the first remote user and the companion broadcaster to each submit his or her unique private cryptographic key and by checking whether the registered profiles in the blockchain correctly correspond for decryption by unique private cryptographic keys submitted by the first remote user and the companion broadcaster; (3) activating a holographic user interface of a first remote user and logging into the blockchain token-authenticated holographic companionship profile and content synthesis and sharing system, wherein the holographic user interface incorporating a main menu is visualized as a hologram by wearing a mixed-reality (MR) head-mounted display (HMD) by the first remote user, and wherein the main menu provides a list of companionship profiles and a list of companion broadcasters; (4) generating a three-dimensional (3D) companionship content of the companion broadcaster with recording equipment comprising a single red-green-blue (RGB)-depth (RGB-D) camera and a computing device to capture and transmit video and audio information to the blockchain token-authenticated holographic companionship profile and content synthesis and sharing system; (5) processing and storing the video and audio information of the 3D companionship content of the companion broadcaster in the blockchain token-authenticated holographic companionship profile and content synthesis and sharing system; (6) transmitting the video and audio information of the 3D companionship content of the companion broadcaster to the first remote user, when a visualization request for the 3D companionship content is made from the main menu of the holographic user interface accessed by the first remote user; and (7) visualizing the 3D companionship content of the companion broadcaster as holograms via the mixed-reality (MR) head-mounted display (HMD) worn by the first remote user.

DETAILED DESCRIPTION

Figure 1:
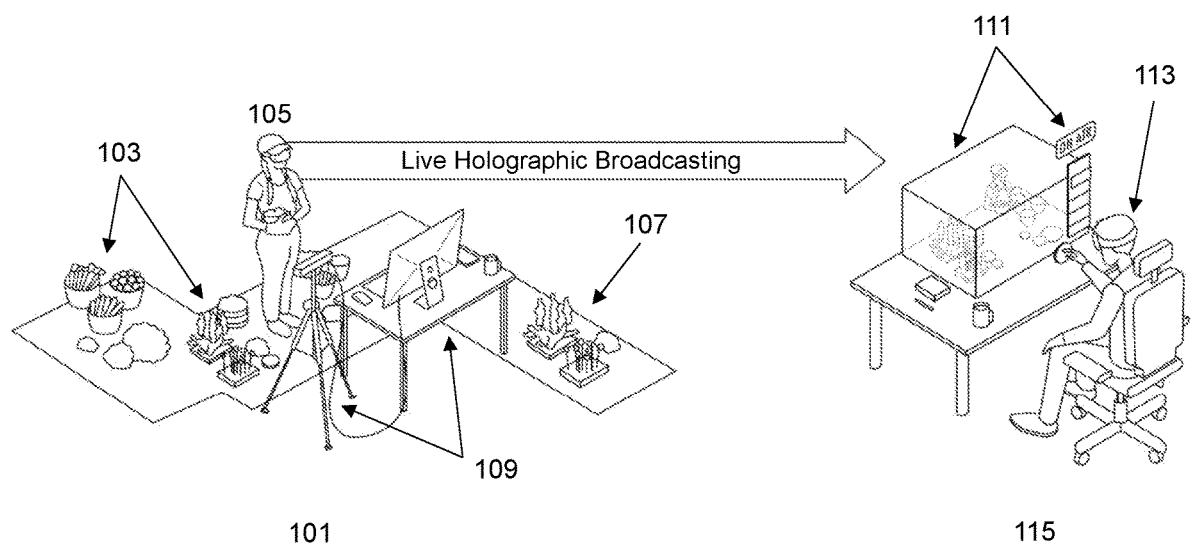
FIG. 1 shows an example of blockchain token-authenticated holographic companionship profile and content synthesis and sharing, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more electronic systems and methods for blockchain token-authenticated holographic companionship profile and content synthesis and sharing. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide a novel electronic system and a related method of operation that securely accommodate holographic content creation and communication among online companions with authenticated profiles.

Furthermore, another objective of an embodiment of the invention is to provide a novel electronic system and a related method of operation that enable blockchain token-authenticated three-dimensional (3D) holographic companionship profile and content synthesis and sharing of holographic contents among authenticated companions.

Another objective of an embodiment of the present invention is to provide a novel electronic system and a related method of operation that enable an immersive mixed-reality visualization of real physical and holographic elements in a designated real physical space occupied by a remote user, who is visualizing a companion broadcaster and associated elements as an intermixture of computer graphics-generated 3D holograms and real physical objects.

For the purpose of describing the invention, a term referred to as "mixed reality," or "MR," as an acronym, is defined as an intermixture of computer-generated lifelike holographic objects and real physical objects that are synchronized and correlated to a particular physical space (e.g. a physical room occupied by a remote user of online dating or friend-finder sites) for immersive three-dimensional (3D) user interactions between a remote user and a companion broadcaster, who are matched or connected by an online dating or friend-finder site. Typically, unlike conventional augmented reality applications, the computer-generated lifelike holographic objects are ultra high-resolution (e.g. 4K/UHD) or high-resolution (e.g. HD quality or above) three-dimensional synthetic objects that are intermixed and/or juxtaposed to real physical objects, wherein a viewer immersed in the mixed-reality environment is often unable to distinguish the synthetic nature of the computer-generated lifelike holographic objects and the real physical objects provided by the mixed-reality environment. Typically, the viewer is required to wear a mixed-reality headset unit or another wearable computing device to visualize and participate in the holographic mixed-reality (HMR) environment that presents events occurring in real time at a companion broadcaster's physical space.

Moreover, for the purpose of describing the invention, a term referred to as "blockchain" is defined as a decentralized public ledger that keeps track of transactions across a network of computer nodes. In a preferred embodiment of the invention, this decentralized public ledger (i.e. a blockchain) can be utilized to build a decentralized public key infrastructure (DPKI) that can oversee creation and management of a decentralized and secure digital identification (i.e. a digital ID). The blockchain can serve as a tamper-proof and trusted medium within the DPKI to distribute an identity holder's asymmetric verification and encryption keys, wherein each online member is empowered to create or anchor cryptographic keys on the blockchain securely, and if desired, chronologically. In this instance, a cryptographic key uniquely associated with an online member can securely be utilized to satisfy identity authentication requests, digital signature verification requests, and personal identity data encryption or decryption requests, without resorting to obtaining digital certificates from conventional and centralized certificate authorities that are more prone to data breaches and hacking attempts.

Furthermore, for the purpose of describing the invention, a term referred to as "blockchain token" is defined as an asset symbolizing a particular identity recorded in the "blockchain," or the decentralized public ledger. In context of the preferred embodiment of the invention, a cryptographic key uniquely associated with an online member is a "blockchain token" incorporating cryptographic proofs, which serves as verifiable digital credentials for activities such as identity authentications, digital signature verifications, and personal identity data encryptions and decryptions of online members.

Moreover, for the purpose of describing the invention, a term referred to as "companion" is defined as a prospective online friend or a prospective online date, who is able to communicate to another online member registered in the blockchain token-authenticated holographic companionship profile and content synthesis and sharing system Likewise, for the purpose of describing the invention, a term referred to as "companionship" is defined as a prospective online friendship or a prospective online romantic relationship among online members registered in the blockchain token-authenticated holographic companionship profile and content synthesis and sharing system.

In addition, for the purpose of describing the invention, a term referred to as "remote user" is defined as a potential companion to a companion broadcaster in a blockchain token-authenticated holographic companionship profile and content synthesis and sharing system. In one embodiment of the invention, the remote user may take a passive role in friendship and date searches by only seeking a desirable companion broadcaster in the system, without broadcasting the remote user's own companion contents. In another embodiment of the invention, the remote user may take a more proactive and bilateral role in friendship and date searches by broadcasting his or her own companion contents, while seeking a desirable companion broadcaster in the system at the same time. Therefore, in some embodiments of the invention, a "remote user" may also serve the role of a "companion broadcaster" to other remote users, if the remote user is taking a more proactive and bilateral role in friendship and date searches by broadcasting his or her own companionship contents while watching other members' companionship contents.

Furthermore, for the purpose of describing the invention, a term referred to as a "mixed-reality artificial layer" is defined as a computer-generated graphics layer in which mixed-reality objects (MROs) and mixed-reality holographic humans (e.g. holographic companion broadcasters, remote users, other online members, etc.) are created and positioned onto virtual coordinates associated with a particular remote user's physical space by a blockchain token-authenticated holographic companionship profile and content synthesis and sharing system.

Moreover, for the purpose of describing the invention, a term referred to as "hologram" is defined as a three-dimensional holographic object configured to be displayed from a head-mounted display (HMD) device, a mobile device executing a mixed-reality visual mobile application, or another electronic device with a visual display unit. Typically, a hologram is capable of being animated as a three-dimensional element over a defined period of time. Examples of holograms utilized in mixed-reality environments generated by a blockchain token-authenticated holographic companionship profile and content synthesis and sharing system include, but are not limited to, a holographic instance of a companion broadcaster, holographic items and elements utilized in companionship contents created by a companion broadcaster, a holographic instance of a remote user communicating with the companion broadcaster, and a holographic room or building structure, which may be intermixed with or juxtaposed to physical objects for seamlessly-vivid visualizations of both artificial holograms and physical objects.

In addition, for the purpose of describing the invention, a term referred to as "three-dimensional model," or "3D model," is defined as one or more computer-generated three-dimensional images, videos, or holograms. In a preferred embodiment of the invention, a computerized 3D model is created as a hologram after multi-angle video data are extracted, transformed, and reconstructed by three-dimensional graphics processing algorithms executed in a computer system or in a cloud computing resource comprising a plurality of networked and parallel-processing computer systems. The computer-generated 3D model can then be utilized as a mixed-reality object (MRO) or a humanized mixed-reality hologram (MRH) in a mixed-reality artificial layer superimposed on a particular physical space correlated by virtual coordinates from a blockchain token-authenticated holographic companionship profile and content synthesis and sharing system.

Moreover, for the purpose of describing the invention, a term referred to as "cloud" is defined as a scalable data network-connected and/or parallel-processing environment for complex graphics computations, transformations, and processing. The data network-connected and/or parallel-processing environment can be provided using a physical connection, a wireless connection, or both. For example, a cloud computing resource comprising a first cloud computing server, a second cloud computing server, and/or any additional number of cloud computing servers can each extract and transform a portion of multi-angle video data simultaneously as part of a scalable parallel processing algorithm, which performs temporal, spatial, and photometrical calibrations, and executes depth map computation, voxel grid reconstruction, and deformed mesh generation. A scalable number of cloud computing servers enables a real-time or near real-time transformation and reconstruction of 3D models after consumer video recording devices transmit multi-angle video data to the cloud computing resource.

FIG. 1 shows an example (100) of blockchain token-authenticated holographic companionship profile and content synthesis and sharing, in accordance with an embodiment of the invention. In this example (100), a companion broadcaster (105) is broadcasting a live, real-time companionship content that involves one or more physical objects (103, 107) in her own room (101) during the live broadcast session. In a preferred embodiment of the invention, the companion broadcaster (105) can utilize her own recording equipment (109) comprising a single red-green-blue (RGB)-depth (RGB-D) camera and a computing device (e.g. a desktop computer, a notebook computer, a smart phone, etc.) to record and transmit video and audio information to a blockchain token-authenticated holographic companionship profile and content synthesis and sharing system. The recorded video and audio information are then further processed by the blockchain token-authenticated holographic companionship profile and content synthesis and sharing system to generate three-dimensional (3D) holograms and audio, and subsequently transmitted to a remote user's 3D hologram visualization device (111) for the remote user's (113) 3D holographic viewing and communication in the remote user's room (115), as illustrated in the example (100) in FIG. 1.

In the preferred embodiment of the invention, the remote user (113) is required to wear a mixed-reality (MR) headset unit to visualize an intermixture of the 3D holographic companionship content created by the companion broadcaster (105) and physical elements in the remote user's room (115). In another embodiment of the invention, the remote user's 3D hologram visualization device (111) is autostereoscopic and does not require the remote user (113) to wear the MR headset for visualization of the 3D holographic companionship content created by the companion broadcaster (105). Preferably, the transmission of the 3D holographic companionship content from the source (i.e. 109) to an intended final destination (i.e. 111), which may also involve intermediate holographic graphical processing by the blockchain token-authenticated holographic companionship profile and content synthesis and sharing system, is supported by ultra-fast wired and/or wireless data network connections, such as high-speed fiber optic lines and 5G wireless networks.

Figure 2:
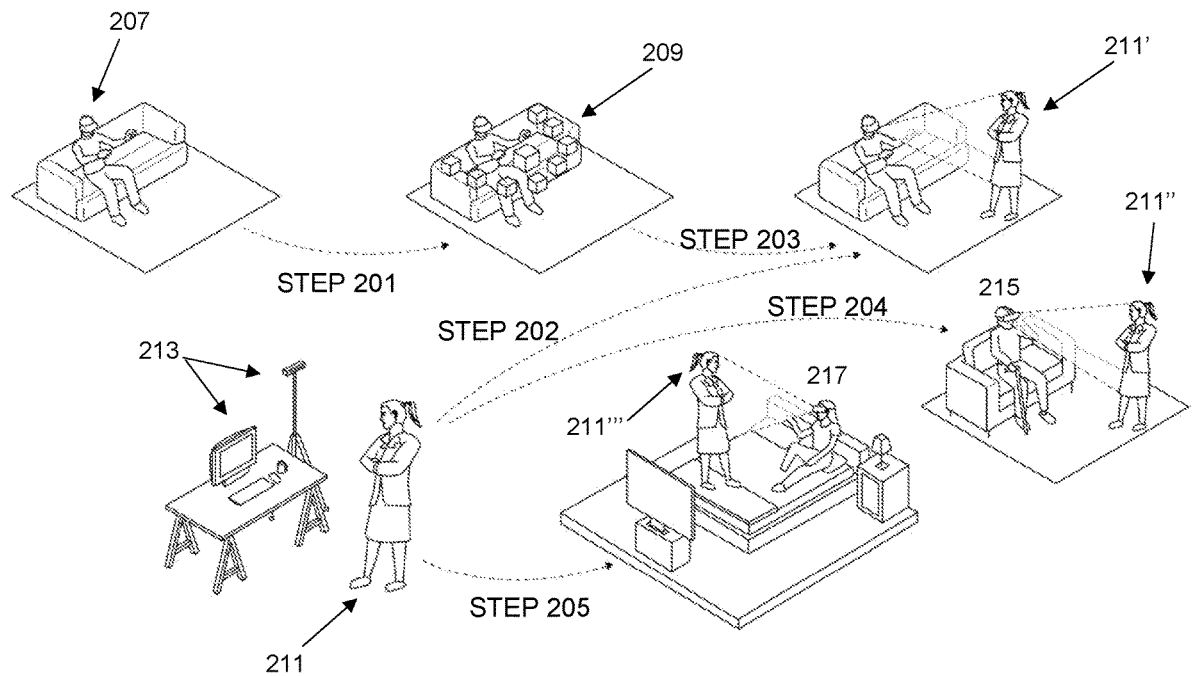
FIG. 2 shows a method of operating a blockchain token-authenticated holographic companionship profile and content synthesis and sharing system, in accordance with an embodiment of the invention.

FIG. 2 shows a method (200) of operating a blockchain token-authenticated holographic companionship profile and content synthesis and sharing system, in accordance with an embodiment of the invention. First, in this embodiment of the invention, a plurality of potential remote users and potential companion broadcasters are required to get their profiles registered and authenticated by a blockchain utilized by the holographic companionship profile and content synthesis and sharing system. In one usage example of the blockchain for profile authentication, a potential remote user or a potential companion broadcaster registers his or her personal profile descriptions and related multimedia files in the blockchain and receives a blockchain token as a unique private cryptographic key, which symbolizes a specific sequential or chronological chain of information stored as part of his or her personal profile.

The potential remote user or the potential companion broadcaster is then required to present this blockchain token in subsequent interactions with the holographic companionship profile and content synthesis and sharing system to prove (i.e. "authenticate") that he or she is indeed the owner of specific sequential chain of information stored as part of his or her personal profile. This novel and unique utilization of the blockchain token authentication in proving genuine ownership of each person's profile during user access and communication in the holographic companionship profile and content synthesis and sharing system enhances the veracity of member authenticity and online member privacy for remote users and companion broadcasters, which in turn improves the overall trustworthiness of the holographic companionship profile and content synthesis and sharing system for all online members.

Continuing with the method (200) as shown in FIG. 2, a first remote user (207) is sitting on a couch in his room and activates a holographic user interface to log into the blockchain token-authenticated holographic companionship profile and content synthesis and sharing system, while wearing a mixed-reality (MR) headset to visualize a main menu (209) as a hologram, as shown in STEP 201. The main menu (209) provides a variety of companionship profiles and a list of companion broadcasters. Each companion broadcaster is represented by a particular companionship profile and may be engaged in real-time broadcasting of a 3D holographic companionship content in one instance, or in providing a playback of a previously-recorded 3D holographic companionship content in another instance. In this example, the first remote user (207) chooses a real-time broadcast of a 3D holographic companionship content generated by one particular female companion broadcaster (211), as shown in STEP 203 in FIG. 2.

As illustrated in the method (200) in FIG. 2, this companion broadcaster (211) utilizes her own recording equipment (213) comprising a single red-green-blue (RGB)-depth (RGB-D) camera and a computing device (e.g. a desktop computer, a notebook computer, a smart phone, etc.) to capture and transmit video and audio information to the blockchain token-authenticated holographic companionship profile and content synthesis and sharing system. The recorded video and audio information are then further processed by the blockchain token-authenticated holographic companionship profile and content synthesis and sharing system to generate three-dimensional (3D) holograms and audio, and subsequently transmitted to the first remote user's (207) MR headset for 3D holographic visualization of a first hologram instance (211') of the companion broadcaster (211) and her 3D holographic companionship content, as illustrated in STEP 202 in FIG. 2. In the preferred embodiment of the invention, the first remote user (207) is empowered and authorized by the holographic companionship profile and content synthesis and sharing system to interact with the first hologram instance (211') of the companion broadcaster (211), as if both parties are engaged in a private face-to-face personal conversation, with full bilateral audio and/or video conference capabilities in real time.

Furthermore, in this example as shown in the method (200) in FIG. 2, a second remote user (215) and a third remote user (217) also chooses the same companion broadcaster (211) for visualization of the real-time broadcast of a 3D holographic companionship content. The blockchain token-authenticated holographic companionship profile and content synthesis and sharing system is further configured to transmit the three-dimensional (3D) holograms and audio associated with the companion broadcaster (211) to the second remote user (215) and third remote user (217) separately and simultaneously, which in turn enables the second remote user (215) to visualize the second hologram instance (211") of the companion broadcaster (211) and her 3D holographic companionship content in the second remote user's (215) personal space through the second remote user's (215) MR headset, as shown in STEP 204, and also enables the third remote user (217) to visualize the third hologram instance (211'") of the companion broadcaster (211) and her 3D holographic companionship content in the third remote user's (217) bedroom through the third remote user's (217) MR headset, as shown in STEP 205.

Figure 3:
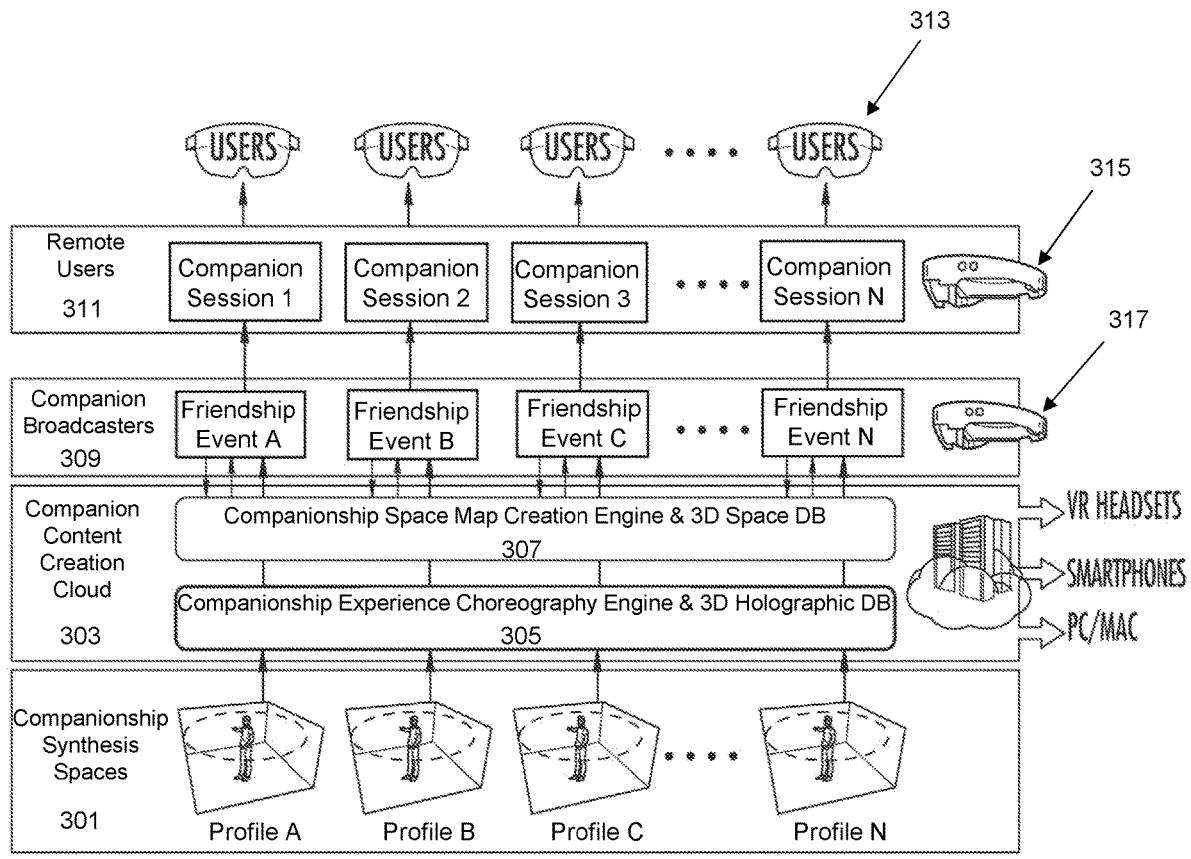
FIG. 3 shows a system block diagram for blockchain token-authenticated holographic companionship profile and content synthesis and sharing, in accordance with an embodiment of the invention.

FIG. 3 shows a system block diagram (300) for blockchain token-authenticated holographic companionship profile and content synthesis and sharing, in accordance with an embodiment of the invention. As illustrated in FIG. 3, the blockchain token-authenticated holographic companionship profile and content synthesis and sharing system is scalable to support a plurality of 3D holographic companionship content creations from a plurality of companionship synthesis spaces (301), each of which is occupied by a specific companion broadcaster with a blockchain token-authenticated profile (i.e. Profile A, Profile B, Profile C, . . . , Profile N). A companion broadcaster may be producing companionship contents anywhere around the world, and only needs a single red-green-blue (RGB)-depth (RGB-D) camera, a computing device (e.g. a desktop computer, a notebook computer, a smart phone, etc.), and a data network connection to record and transmit video and audio information to a companion content creation cloud module (303) integrated the blockchain token-authenticated holographic companionship profile and content synthesis and sharing system.

In the system block diagram (300) as shown in FIG. 3, the companion content creation cloud module (303) comprises a companionship experience choreography engine and a 3D holographic database (305) and a companionship space map creation engine and a 3D space database (307). In a preferred embodiment of the invention, the companionship experience choreography engine and the 3D holographic database (305) receives a stream of video and audio information per each currently-active companion broadcaster producing a companionship content. The received video and audio information per each companionship content is then graphically transformed into three-dimensional (3D) holograms comprising a plurality of holographic objects. In one instance, the holographic objects in this graphically transformation may be visually identical to physical objects present in the stream of video and audio information from a particular companion broadcaster, when the holographic objects are later visualized by a remote user.

In another instance, the holographic objects in this graphically transformation may intentionally look different from the corresponding physical objects in the stream of video and audio information from the particular companion broadcaster for more visual dynamism or enhanced privacy of the companion broadcaster. For example, if a companion broadcaster wants to show her plants and flowers in her room in a companionship content with detailed explanation of her opinions on each plant, but does not want to show her clothes laying around a bed and a computer screen next to her plants and flowers to remote users, the companionship experience choreography engine and the 3D holographic database (305) can visually delete what the companion broadcaster selected as "private" objects (i.e. cloths laying around the bed and the computer screen next to her plants and flowers, in this case) and substitute them with generic flower and plant holograms, when the companionship content is later visualized by a remote user with an MR headset.

In the preferred embodiment of the invention, the companionship experience choreography engine and the 3D holographic database (305) allows the companion broadcaster to select a holographic object from the 3D holographic database and place the holographic object in a particular location of a 3D companion space map comprising one or more MR artificial layers and virtual coordinates superimposed on a physical space. This holographic object addition or substitution to the companion broadcaster's companionship content may be configured on the fly during a real-time broadcast, or arranged before or after the real-time broadcast, depending on a user preference parameter specified by the companion broadcaster. The companionship experience choreography engine and the 3D holographic database (305) in the companion content creation cloud (303) module are able to delete, replace, or substitute a holographic object within the companion broadcaster's companionship content dynamically (i.e. "on the fly") upon receiving a modification request made by the companion broadcaster for enhanced broadcaster privacy or content quality.

Furthermore, the companionship experience choreography engine also allows the companion broadcaster to create a series of prespecified or potential interactions, or "choreographies," between a holographic object in the companion broadcaster's companionship content and a remote user visualizing it through an MR headset. In the preferred embodiment of the invention, the holographic object may be a hologram instance of the companion broadcaster himself/herself, or an item presented in the companion broadcaster's companionship content.

Moreover, the companionship space map creation engine and the 3D space database (307) in the companion content creation cloud module (303) enables the companion broadcaster to wear a head-mounted display (HMD) device and walk-through his or her companionship synthesis space, which in turn activates the companionship space map creation engine in the companion content creation cloud module (303) to intelligently and automatically generate a 3D companionship space map from visual information gathered by the HMD. In the preferred embodiment of the invention, the 3D companionship space map may represent the companion broadcaster's personal living space, an office space, or a travel destination of interest. This intelligent machine-generated 3D companionship space map can be utilized as a mixed-reality artificial layer with virtual coordinates superimposed on a remote user's personal space during viewing, and stored in the 3D space database in the companion content creation cloud module (303).

In the preferred embodiment, the companion content creation cloud module (303) is a 3D graphics-generating software element for the companionship space map creation engine and for the companionship experience choreography engine, as shown in the system block diagram (300) in FIG. 3. The companion content creation cloud module (303) also incorporates or connects to 3D companionship space map and 3D holographic relational databases (DBs) as dynamic storages of 3D companionship space maps and holograms (e.g. items in a companionship content, furniture, building structure, landscape, human avatars, etc.) generated by the 3D graphics-generating software element. Typically, the companion content creation cloud module (303) is executed by a scalable number of CPUs, GPUs, and memory units in one or more high-performance cloud-networked computer servers suited for 3D graphics processing. The companion content creation cloud module (303) is also operatively connected to the companionship synthesis spaces (301) utilized by a plurality of companion broadcasters with authenticated profiles, HMDs (317) worn by the plurality of companion broadcasters (309), each of whom is responsible for a particular friendship event (e.g. Friendship Event A, B, C, . . . N), and HMDs (313, 315) worn by a plurality of remote users (311), each of whom is immersed in a particular companion communication environment through a companion session (e.g. Companion Session 1, 2, 3, . . . , N). Depending on the preferences configured by remote users and companion broadcasters, the companion session may be a live real-time session in one instance, or a recorded playback session in another instance, with a pre-arranged interactive choreography designed and determined by a particular companion broadcaster prior to the recorded playback session.

In one embodiment of the invention, the digitized holographic model content stored in the 3D holographic database in the companion content creation cloud module (303) can be compressed and sub-divided as an object (OBJ) file and a digital asset exchange (DAE) file, wherein the OBJ file contains compressed multi-angle graphics data representing a particular holographic model, and wherein the DAE file contains digital graphics compatibility schemes and/or information, typically based on COLLADA (collaborative design activity) XML schema or another industry-standardized graphics compatibility scheme.

Then, the compressed holographic model content files (e.g. OBJ and DAE files) can be utilized by one or more holographic app and service toolkits, such as WebGL, Unity, and Unreal Engine, by the companion broadcasters to envision, generate, modify, and manage a variety of companionship content applications and service offerings. In context of the system block diagram (300) in FIG. 3, the holographic app and service toolkits may be integrated into or operatively connected to the companionship experience choreography engine and the companionship space map creation engine in the companion content creation cloud module (303) in the blockchain token-authenticated holographic companionship profile and content synthesis and sharing system.

The system block diagram (300) for the blockchain token-authenticated holographic companionship profile and content synthesis and sharing system in FIG. 3 also incorporates the HMDs (313, 315) worn by the plurality of remote users (311), wherein each HMD (313, 315) worn by a remote user executes one or more software sub-modules in a CPU, a GPU, and/or a memory unit of each HMD (313, 315) worn by each remote user. In another embodiment, another portable electronic device (e.g. a smart phone, a table computer, etc.) capable of displaying mixed-reality environments via camera-enabled mobile applications may be utilized by a remote user instead of an HMD. Preferably, each HMD (313, 315) worn by a remote user incorporates a remote user's mixed-reality visualization interface and a particular companion communication environment through a companion session (e.g. Companion Session 1, 2, 3, . . . , N), which are executed and displayed by one or more portable electronic devices utilized by the remote user.

Furthermore, in one embodiment of the invention, the blockchain token-authenticated holographic companionship profile and content synthesis and sharing system may also incorporate a holographic mixed-reality browser and a third-party holographic application loader that are configured to load and display various holographic third-party companionship content apps by connecting to and downloading various software applications from a cloud-connected computer server, which executes a third-party holographic companionship content application database and a companionship-related hologram software development kit (SDK) for implementation and deployment of various holographic companionship content applications that can be utilized in holographic mixed-reality environments. In one instance, a "third-party" refers to an independent group of holographic companionship content app developers who are not employees of the blockchain token-authenticated holographic companionship profile and content synthesis and sharing system operators, companion broadcasters, or remote users.

Figure 4:
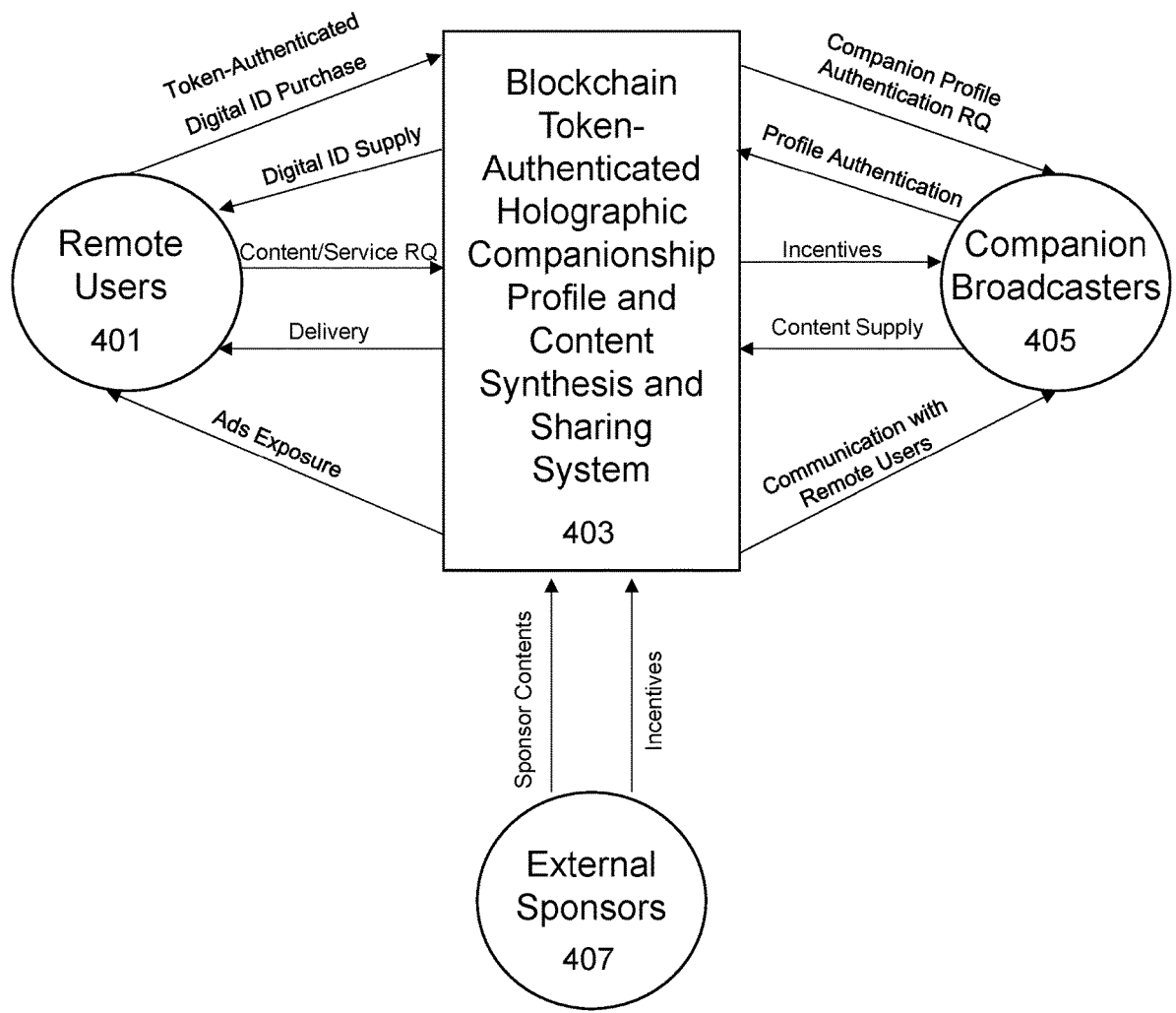
FIG. 4 shows a dataflow diagram for blockchain token-authenticated holographic companionship profile and content synthesis and sharing, in accordance with an embodiment of the invention.

FIG. 4 shows a dataflow diagram (400) for blockchain token-authenticated holographic companionship profile and content synthesis and sharing, in accordance with an embodiment of the invention. The blockchain token-authenticated holographic companionship profile and content synthesis and sharing system (403) is uniquely configured to authenticate identities, communications, and transactions between remote users (401) and companion broadcasters (405). In a preferred embodiment of the invention, a decentralized public ledger (i.e. a blockchain), which keeps track of transactions across a network of computer nodes, can be utilized to build a decentralized public key infrastructure (DPKI) that can oversee creation and management of a decentralized and secure digital identification (i.e. a digital ID). The blockchain can serve as a tamper-proof and trusted medium within the DPKI to distribute an identity holder's asymmetric verification and encryption keys, wherein each online member (e.g. a remote user or a companion broadcaster) is empowered to create or anchor cryptographic keys on the blockchain securely, and if desired, chronologically. In this instance, a cryptographic key uniquely associated with an online member can securely be utilized to satisfy identity authentication requests, digital signature verification requests, and personal identity data encryption or decryption requests, without resorting to obtaining digital certificates from conventional and centralized certificate authorities that are more prone to data breaches and hacking attempts.

Furthermore, a "blockchain token," which is an asset symbolizing a particular identity recorded in the blockchain, can be utilized as a cryptographic key uniquely associated with an online member, wherein the blockchain token incorporates cryptographic proofs that serve as verifiable digital credentials for activities such as identity authentications, digital signature verifications, and personal identity data encryptions and decryptions of online members. In the dataflow diagram (400) as shown in FIG. 4, the remote users (401) and the companion broadcasters (405) are required to get their profiles registered and authenticated by a blockchain utilized by the blockchain token-authenticated holographic companionship profile and content synthesis and sharing system (403). In one usage example of the blockchain for profile authentication, a potential remote user or a potential companion broadcaster registers his or her personal profile descriptions and related multimedia files in the blockchain and receives a blockchain token as a unique private cryptographic key, which symbolizes a specific sequential or chronological chain of information stored as part of his or her personal profile.

The potential remote user or the potential companion broadcaster is then required to present this blockchain token in subsequent interactions with the blockchain token-authenticated holographic companionship profile and content synthesis and sharing system (403) to prove (i.e. "authenticate") that he or she is indeed the owner of specific sequential or chronological chain of information stored as part of his or her personal profile. This novel and unique utilization of the blockchain token authentication in proving genuine ownership of each person's profile during user access and communication in the blockchain token-authenticated holographic companionship profile and content synthesis and sharing system (403) enhances the veracity of member authenticity and online member privacy for the remote users (401) and companion broadcasters (405), which in turn improves the overall trustworthiness of the blockchain token-authenticated holographic companionship profile and content synthesis and sharing system (403) for all online members.

As shown in the dataflow diagram (400), the remote users (401) can make blockchain token-authenticated digital identity (ID) purchase, receive digital IDs upon successful authentication, and initiate content or service requests for companionship contents to the blockchain token-authenticated holographic companionship profile and content synthesis and sharing system (403). In return, the blockchain token-authenticated holographic companionship profile and content synthesis and sharing system (403) is able to provide companion profile authentication services to the companion broadcasters (405) and also relay and graphically transform the companionship contents from the companion broadcasters (405) to 3D holograms for mixed reality (MR) visualization by the remote users (401). In the preferred embodiment of the invention, the blockchain token-authenticated holographic companionship profile and content synthesis and sharing system (403) is also operatively connected to external sponsors (407), who can provide sponsor contents (e.g. business advertisements, offers, etc.) to the remote users (401) and financial incentives to the companion broadcasters (405), as shown in the dataflow diagram (400) in FIG. 4. Once a holographic communication is established between a remote user and a companion broadcaster, the blockchain token-authenticated holographic companionship profile and content synthesis and sharing system (403) is able to provide a live, real-time streaming 3D holographic companion session between the remote user and the companion broadcaster. The companion broadcaster may elect to communicate with just one remote user at a time per session, or alternatively, elect to communicate with a multiple number of remote users simultaneously during the companion broadcaster's friendship event represented in a companion session.

Figure 5:
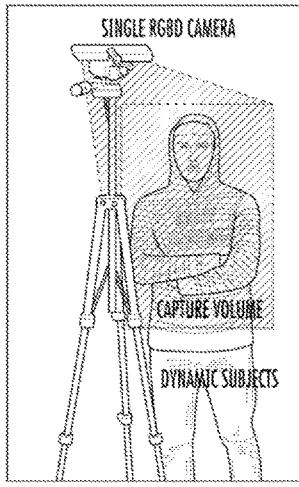
FIG. 5 shows a single camera and machine learning-based holographic image capture example utilized in blockchain token-authenticated holographic companionship profile and content synthesis and sharing, in accordance with an embodiment of the invention.
Figure 5:
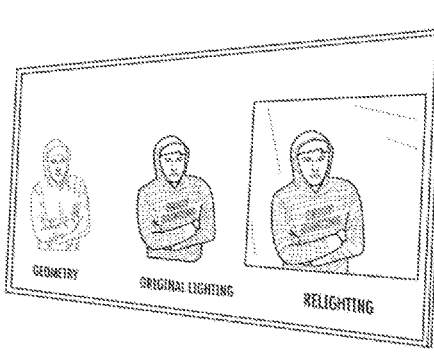

FIG. 5 shows a single camera and machine learning-based holographic image capture example (500) utilized in blockchain token-authenticated holographic companionship profile and content synthesis and sharing, in accordance with an embodiment of the invention. In this embodiment, a single red-green-blue (RGB)-depth (RGB-D) camera is utilized to capture the motion of a dynamic target, which is required to rotate around the RGB-D camera, instead of capturing three-dimensional volume of the dynamic target conventionally with a plurality of multi-angle cameras positioned around the dynamic target. Examples of the dynamic target may include, but are not limited to, a human subject, an animal, or another movable object targeted for a corresponding holographic representation.

As illustrated in a first view (501) in this example (500), the single RGB-D camera is configured to capture the three-dimensional (3D) volume of a targeted person (i.e. a dynamic target subject), who is required to rotate around the single RGB-D camera. Then, as further illustrated in a second view (503) in this example (500), the captured 3D volume of the dynamic target subject is further refined (i.e. sharpened and improved in image clarity and resolution), extrapolated, and synthesized with one or more holographic object reconstruction methods and/or algorithms executed on a graphics server to produce a hologram that replicates the 3D appearance of the dynamic target subject. For example, the captured 3D volume of the dynamic target subject undergoes computerized graphical transformations, such as relighting, subject depth calculations, geometrical extrapolations, and volumetric reconstructions in one or more machine-learning graphical servers. The resulting hologram produced in this fashion embodies at least some movements or changes in the appearance of the dynamic target subject over a specified amount of time, thus incorporating an additional dimension of time to function as a 4-dimensional (4D) hologram, wherein the first 3 dimensions are related to the 3D volume (i.e. x, y, z coordinates) of the dynamic target subject, which is synthetically animated over time as the fourth dimension to the hologram.

Figure 6:
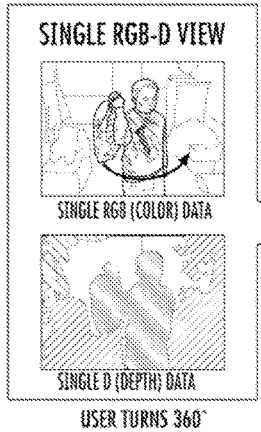
FIG. 6 shows a target object-initiated self-rotation around the single camera and machine learning apparatus for hologram generation utilized in blockchain token-authenticated holographic companionship profile and content synthesis and sharing, in accordance with an embodiment of the invention.
Figure 6:
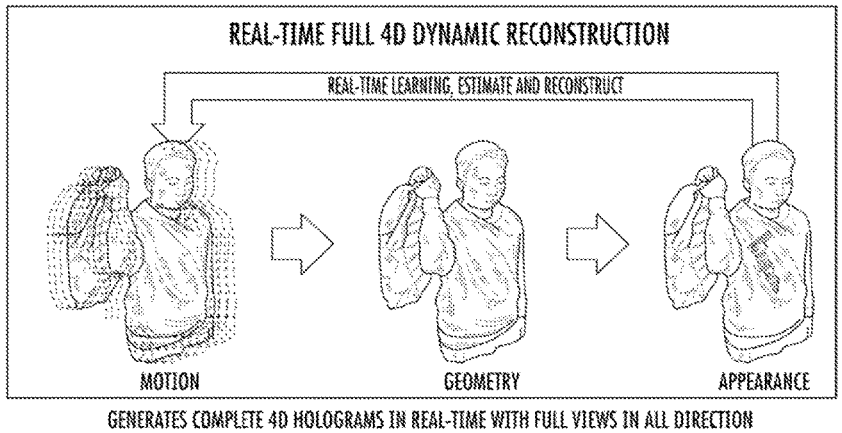

FIG. 6 shows a target object-initiated self-rotation example (600) around the single camera and machine learning apparatus for hologram generation utilized in blockchain token-authenticated holographic companionship profile and content synthesis and sharing, in accordance with an embodiment of the invention. This target object-initiated self-rotation example (600) embodies a 4D dynamic hologram production sequence involving a target object-initiated self-rotation around a single camera and a machine-learning apparatus for hologram generation, in accordance with an embodiment of the invention. As shown in a first step (601) of the 4D dynamic hologram production sequence, the dynamic target subject, which in this case is a human subject, initiates a 360-degree self-rotation in front of a single RGB-D camera. Instead of the conventional multi-angle positioning of a plurality of cameras that are utilized in conventional hologram production, this embodiment of the present invention requires only one specialty camera designed to capture the color (i.e. "RGB") data as well as the subject-depth (D) data from the singular position of only one camera, as the dynamic target subject voluntarily provides a 360-degree rotation motion in front of the single RGB-D camera, as shown in the first step (601).

Once the RGB data and the subject-depth data associated with the dynamic target subject are captured by the single RGB-D camera, the machine-learning apparatus comprising one or more graphical processing units (GPUs) integrated in a computer server for the companion content creation cloud module (i.e. 303 in FIG. 3) executes a feedback loop-based real-time full 4D dynamic reconstruction process that first creates a volumetric 4D graphical representation of the dynamic target subject from the RGB data and the subject-depth data gathered from the subject's 360-degree rotating motions. Then, as shown in a second step (603) of the 4D dynamic hologram production sequence, the initial version of the volumetric 4D graphical representation undergoes intelligent machine-learning with real-time subject RGB and depth data parameters and artificial intelligence-based graphical extrapolations and estimations in a continuous feedback loop to produce more refined (i.e. sharpened, improved) geometries for the volumetric 4D graphical representation of the dynamic target subject. After multiple rounds of the intelligent machine-learning refinements of the volumetric 4D graphical representation of the dynamic target subject in the continuous feedback loop, the resulting volumetric 4D graphical representation becomes a higher-resolution volumetric hologram that sufficiently satisfies user needs for multi-party holographic applications and communications in a mixed-reality (MR) environment.

Figure 7:
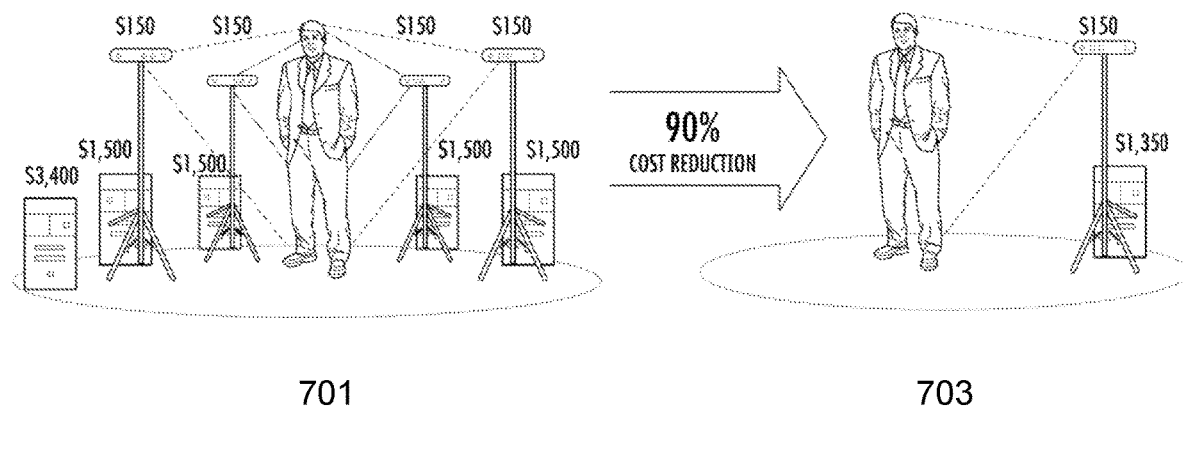
FIG. 7 shows cost and convenience advantage of the single camera and machine learning-based holographic image capture method utilized in blockchain token-authenticated holographic companionship profile and content synthesis and sharing, in accordance with an embodiment of the invention.

FIG. 7 shows cost and convenience advantage example (700) of the single camera and machine learning-based holographic image capture method utilized in blockchain token-authenticated holographic companionship profile and content synthesis and sharing, in accordance with an embodiment of the invention. In particular, this example (700) illustrates the cost and convenience advantage of the single RGB-D camera and machine learning-based holographic image capture method (703) relative to a conventional hologram-generating method (701) that involves conventional multi-angle position cameras and related conventional graphics processing equipment, in accordance with an embodiment of the invention.

As shown in this figure, the conventional hologram-generating method (701) typically utilizes conventional digital cameras, which lack the ability to provide depth (D) parameters of a target subject with a single angle alone. In the conventional hologram-generating method (701), a plurality of conventional digital cameras are placed around the target subject and the angle of each camera is carefully pre-calibrated and inputted into one or more conventional (i.e. non machine-learning based) graphics servers to construct a hologram. Therefore, the logistics of setting up the pre-calibrated angular positions of multiple cameras are often overly complicated, and the exorbitant expense of utilizing multiple cameras and multiple conventional graphics servers acts as a barrier to a widespread adoption of hologram generation and holographic communications.

In contrast, the single RGB-D camera and machine learning-based holographic image capture method (703) presented in various embodiments of the present invention is novel, logistically simple, and cost effective, as the target subject is required to rotate 360-degrees in front of a unique camera equipment (i.e. RGB-D camera) capable of capturing not only color data but also real-time depth parameters (i.e. z-axis for three-dimensional depth perception) of the target subject. In one embodiment of the invention, one or more distance-measuring lasers may be incorporated into the RGB-D camera to measure accurate depths of the target subject. In another embodiment of the invention, infrared or ultrasonic sensors may be incorporated into the RGB-D camera to determine approximate depths of the target subject, even if the depth-determination data is not as finely granular as laser-based measurements. Yet in another embodiment of the invention, a multiple number of lenses may be incorporated into the RGB-D camera to provide depth measurements of the target subject.

The self-rotation provided by the target subject and the intelligent machine-learning of volumetric extrapolations, estimations, and refinements in a hologram production feedback loop, as previously shown in FIGS. 5-6, enable this embodiment of the present invention to synthesize a hologram that represents the target subject far more conveniently and cost-effectively, compared to the conventional hologram-generating method (701). In the cost and convenience advantage example (700) illustrated in FIG. 7, the single RGB-D camera and machine learning-based holographic image capture method with the target subject's 360-degree self-rotation in front of the RGB-D camera (703) may be up to 90 percent cheaper than the conventional hologram-generating method (701) that traditionally utilizes finely pre-calibrated multi-angle cameras prior to image capture.

Figure 8:
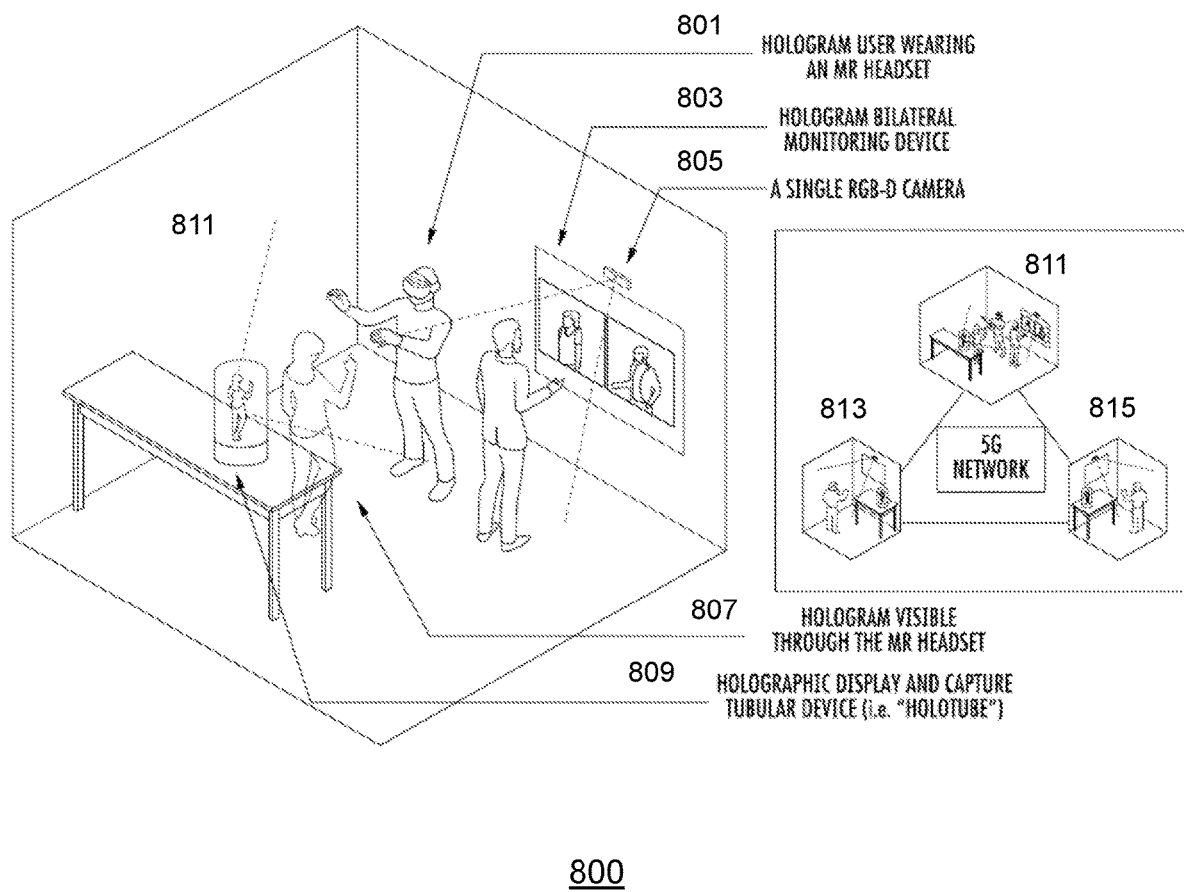
FIG. 8 shows a blockchain token-authenticated holographic companionship profile and content synthesis and sharing example, in accordance with an embodiment of the invention.

FIG. 8 shows a blockchain token-authenticated holographic companionship profile and content synthesis and sharing example (800), in accordance with an embodiment of the invention. In particular, this example (800) illustrates a novel holographic companionship communication room system configuration, in accordance with an embodiment of the invention. The system configuration in this embodiment comprises a novel holographic companionship communication room (811) with one or more vertical walls, a hologram bilateral monitoring device (803) mounted on a vertical wall of the room, a single RGB-D camera (805) installed near the hologram bilateral monitoring device (803), a mixed-reality (MR) headset (801) worn by a remote user or a companion broadcaster, a hologram (807) visible through the MR headset (801), and an autostereoscopic holographic display and capture tubular device (809) that does not require a separate headset gear to visualize the hologram, as shown in the novel holographic companionship communication room system configuration in FIG. 8.

Preferably, the novel holographic companionship communication room (811) also incorporates a holographic visualization table to place the autostereoscopic holographic display and capture tubular device (809) on top of the table's surface. The equipment (e.g. 801, 803, 805, 807, 809) installed in each novel holographic companionship communication room (811) may be standardized across the same types of rooms constructed in various locations. Similarly, the dimensions (e.g. 2.5 m×2.5 m) of each novel holographic companionship communication room (811) may be standardized as a "single cell" model unit that can be replicated in physical constructions of novel holographic companionship communication rooms as "multiple cells" that are operatively connected across even great distances (e.g. 811, 813, 815) to formulate a novel holographic companionship communication ecosystem comprising a numerous and scalable number of holographic companionship communication rooms using a 5G wireless data network and/or another broadband network, as shown in the example (800) in FIG. 8.

In a preferred embodiment of the invention, the novel holographic companionship communication room (811) may be an enclosed room or a booth with one or more vertical walls, which are predefined in standardized dimensions with installation plans that are also predefined with a standardized suite of electronic equipment for installation within the enclosed room or the booth structure. In the particular novel holographic companionship communication room (811) system configuration as shown in FIG. 8, this standardized room or booth space is approximately 2.5 meters wide and 2.5 meters long, and can accommodate one to three companion broadcasters to conduct or experience holographic transports and communications with remotely-located users in other standardized holographic companionship communication room systems. By performing a 360-degree self-rotation in front of the single RGB-D camera (805), each companion broadcaster is also able to create one's own hologram representing his or her appearance in the novel holographic companionship communication room (811), which either contains or operatively connected to a graphics processing server executing a real-time full 4D dynamic reconstruction module that creates, estimates, extrapolates, and refines (i.e. sharpens, improves, etc.) the companion broadcaster's holographic representations based on a machine-learning feedback loop during the companion broadcaster's 360-degree self-rotation sequence. In addition, the 360-degree self-rotation method in front of the single RGB-D camera (805) may also be utilized to create and record a companion broadcaster's own 4D holographic contents inside the room, even if no real-time holographic communication is invoked with another person in another holographic companionship communication room.

Furthermore, the hologram bilateral monitoring device (803) is configured to provide a simultaneous and juxtaposed (i.e. side-by-side) visualization of a holographic representation of an online companionship member (e.g. a remote user or a companion broadcaster) standing in front of the single RGB-D camera (805), while also displaying, in real-time, another holographic representation of the online companionship member's communication partner, who is remotely located outside the holographic companionship communication room (811). In addition, the MR headset (801) worn by another user in the room enables in-room visualization of another remotely-located communication partner as the hologram (807) visible through the MR headset (801). Preferably, the hologram (807) visible through the MR headset (801) is a life-size 1-to-1 ratio representation of the remotely-located communication partner.

As shown in FIG. 8, if the user is not wearing the MR headset (801), he or she is also able to visualize that remotely-located communication partner as an autostereoscopic hologram generated inside the autostereoscopic holographic display and capture tubular device (809). Users in one holographic companionship communication room are also empowered to collaborate in mixed-reality collaborative decoration of a hologram in real-time with other users in other holographic companionship communication rooms, which are located remotely around the world.

Moreover, users inside the holographic companionship communication room (811) are also able to search and retrieve recorded (i.e. non real-time) holograms and holographic contents to experience recorded 4D holographic companionship contents, concerts, shows, and sporting events, in addition to being able to participate in real-time holographic communications with other users in other holographic companionship communication rooms installed around the world. The recorded holographic contents may be free, pay-per-view, or subscription view-based.

One key advantage of this novel holographic companionship communication room (811) system configuration is the compactness of the required space. Because only one specialty RGB-D camera is utilized in the target object image capture, instead of conventional multi-angled cameras surrounding the target object, the novel holographic companionship communication room can be designed in a tight space, while completely eliminating the need for cumbersome multiple camera angle calibrations that require inefficient time and effort in conventional hologram generation methods. Another key advantage of this novel holographic companionship communication room (811) system configuration is the cost efficiency related to the reduced number of cameras and the graphics processing servers required in real-time hologram synthesis, which is made possible by instructing each user to self-rotate himself or herself 360-degrees in front of one specialty RGB-D camera, and by executing a novel real-time full 4D dynamic reconstruction module that creates, estimates, extrapolates, and refines the user's holographic representations based on a machine-learning feedback loop during the user's 360-degree self-rotation sequence, as previously illustrated in FIGS. 5 and 6.

Various embodiments of a blockchain token-authenticated holographic companionship profile and content synthesis and sharing system and related methods of operating such a system described herein provide significant and unique advantages to conventional online dating and friend-finder service operations. For example, one advantage of the novel system and the method of operating this system is enabling a secure accommodation of holographic content creation and communication among online companions with authenticated profiles, while minimizing fake and/or ghost profiles in the online membership community.

Furthermore, another advantage of the novel system and the method of operating this system is enabling blockchain token-authenticated three-dimensional (3D) holographic companionship profile and content synthesis and sharing of holographic contents among authenticated companions, with enhanced trustworthiness and veracity of each member, compared to conventional online dating and friend-finder services.

In addition, another advantage of the novel system and the method of operating this system is enabling an immersive mixed-reality visualization of real physical and holographic elements in a designated real physical space occupied by a remote user, who is visualizing a companion broadcaster and associated elements as an intermixture of computer graphics-generated 3D holograms and real physical objects.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. A method of operating a blockchain token-authenticated holographic companionship profile and content synthesis and sharing system, the method comprising the steps of:
    registering profiles of potential remote users and potential companion broadcasters with a blockchain, wherein each of the potential remote users and the potential companion broadcasters registers his or her personal profile description and related multimedia file in the blockchain and receives a blockchain token as a unique private cryptographic key, which symbolizes a specific chronological chain of information stored as part of his or her personal profile;
    authenticating registered profiles of a first remote user and a companion broadcaster with the blockchain by requiring the first remote user and the companion broadcaster to each submit his or her unique private cryptographic key and by checking whether the registered profiles in the blockchain correctly correspond for decryption by unique private cryptographic keys submitted by the first remote user and the companion broadcaster;
    activating a holographic user interface of a first remote user and logging into the blockchain token-authenticated holographic companionship profile and content synthesis and sharing system, wherein the holographic user interface incorporating a main menu is visualized as a hologram by wearing a mixed-reality (MR) head-mounted display (HMD) by the first remote user, and wherein the main menu provides a list of companionship profiles and a list of companion broadcasters;
    generating a three-dimensional (3D) companionship content of the companion broadcaster with recording equipment comprising a single red-green-blue (RGB)-depth (RGB-D) camera and a computing device incorporating a graphics processor, wherein the companion broadcaster, instead of using conventional multi-angle multiple cameras for 3D image capture, physically rotates a target object 360-degrees at least once in front of the single RGB-D camera to create three-dimensional (3D) volume information that includes both RGB color data and real-time z-axis depth parameters of the target object over a specified duration, wherein the 3D volume information obtained from a 360-degree physical rotation of the target object over the specified duration contains sufficient time-variable volumetric information of the target object to create and sharpen a computerized hologram of the target object in the graphics processor, while not utilizing images from the conventional multi-angle multiple cameras;
    transmitting the computerized hologram of the target object and video and audio information of the 3D companionship content generated from the single RGB-D camera and the computing device to the blockchain token-authenticated holographic companionship profile and content synthesis and sharing system;
    processing and storing the computerized hologram of the target object and the video and audio information of the 3D companionship content of the companion broadcaster in the blockchain token-authenticated holographic companionship profile and content synthesis and sharing system;
    transmitting the computerized hologram of the target object and the video and audio information of the 3D companionship content of the companion broadcaster to the first remote user, when a visualization request for the 3D companionship content is made from the main menu of the holographic user interface accessed by the first remote user; and
    visualizing the 3D companionship content of the companion broadcaster as holograms via the mixed-reality (MR) head-mounted display (HMD) worn by the first remote user.

2. The method of claim 1, further comprising a step of communicating bilaterally in real time between the first remote user and the companion broadcaster through the holograms as a romantic or friendship-building experience.

3. The method of claim 1, further comprising a step of visualizing the 3D companion content of the companion broadcaster by other registered remote users, when and if they successfully authenticated their profiles in the blockchain with their blockchain tokens.

4. The method of claim 1, wherein the single red-green-blue (RGB)-depth (RGB-D) camera is integrated into a head-mounted mixed-reality recording and display device worn by the companion broadcaster.

5. The method of claim 1, wherein the computing device utilized as part of the recording equipment by the companion broadcaster is a desktop computer, a notebook computer, or a smart phone.

6. The method of claim 1, wherein the step of visualizing the 3D companionship content of the companion broadcaster occurs during a live real-time broadcast of a friendship event organized by the companion broadcaster.

7. The method of claim 1, wherein the step of visualizing the 3D companionship content of the companion broadcaster is part of a playback of a previously-recorded broadcast of a friendship event organized by the companion broadcaster.

8. The method of claim 1, wherein the first remote user also functions as a second companion broadcaster in the blockchain token-authenticated holographic companionship profile and content synthesis and sharing system by creating, recording, and broadcasting a second 3D companionship content, which is visualized by the companion broadcaster or other registered remote users.

\* \* \* \* \*